US012609922B2

(12) United States Patent
Lanov

(10) Patent No.: US 12,609,922 B2
(45) Date of Patent: Apr. 21, 2026

(54) MULTI-FACTOR ENABLED ACCESS USING RANDOMLY SELECTED DIGITAL IDENTITY AUTHENTICATION FACTORS

(71) Applicant: Cisco Technology, Inc., San Jose, CA (US)

(72) Inventor: Dennis Lanov, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 18/128,577

(22) Filed: Mar. 30, 2023

(65) Prior Publication Data

US 2024/0333708 A1      Oct. 3, 2024

(51) Int. Cl.
*G06F 7/04*          (2006.01)
*H04L 9/40*          (2022.01)

(52) U.S. Cl.
CPC ........ *H04L 63/083* (2013.01); *H04L 63/0876* (2013.01); *H04L 63/102* (2013.01); *H04L 2463/082* (2013.01)

(58) Field of Classification Search
CPC ........ G06F 21/31; G06F 21/32; G06F 21/335; H04L 63/083; H04L 63/0876; H04L 63/102; H04L 63/0861
See application file for complete search history.

(56) References Cited

U.S. PATENT DOCUMENTS 8,955,066 B1 *   2/2015   Ackerman ............ G06F 21/316
726/5

11,295,567 B1     4/2022   Kocher et al.
12,248,546 B2 *   3/2025   Lee ........................ G06F 21/32
(Continued)

FOREIGN PATENT DOCUMENTS

WO        WO2018015481        1/2018

OTHER PUBLICATIONS

Agbinya et al, Developmental of Digital Environment Identity (Deity) System for Online Access, Nov. 26, 2008, IEEE, pp. 1-18. (Year: 2008).*

(Continued)

*Primary Examiner* — Philip J Chea
*Assistant Examiner* — Jenise E Jackson
(74) *Attorney, Agent, or Firm* — Lee & Hayes, P.C.

(57)          ABSTRACT

Techniques are described for providing multifactor authentication using randomly selected Digital Identity factors associated with a human user or individual seeking access to a facility, building, computer system, network, application, memory, etc. Digital Identity factors are or memory. Digital Identity factors are retrieved and stored by an authentication agent. The Digital Identity factors can be retrieved from a network such as the internet or can be previously provided by a customer or human individual requesting authorization. Upon receiving a request for authentication, a plurality of Digital Authentication factors are randomly selected. A request is sent to an environment associated with the human individual seeking access, the request including information regarding the randomly selected Digital Authentication factors. A reply is received having information regarding the randomly selected authentication factors. The information in the reply is compared with the randomly Digital Identity factors to determine whether to grant or deny access.

20 Claims, 8 Drawing Sheets

400 —↘

(56) References Cited

U.S. PATENT DOCUMENTS

| | | | |
|---|---|---|---|
| 2003/0120934 A1 | 6/2003 | Ortiz | |
| 2014/0012739 A1* | 1/2014 | Wall ..................... | G06Q 20/383 |
| | | | 705/39 |
| 2014/0136419 A1* | 5/2014 | Kiyohara ......... | G06Q 20/40145 |
| | | | 705/67 |
| 2016/0162971 A1* | 6/2016 | Peterson ............ | G06Q 30/0627 |
| | | | 705/26.63 |
| 2016/0359838 A1* | 12/2016 | Dasgupta ................ | H04L 63/08 |
| 2020/0396219 A1* | 12/2020 | Bhargava ........... | G06V 40/1365 |
| 2021/0092128 A1 | 3/2021 | Leblang et al. | |
| 2021/0264006 A1* | 8/2021 | VanBlon ................. | G06F 21/45 |
| 2022/0030416 A1* | 1/2022 | Lee ......................... | H04W 4/60 |
| 2022/0046016 A1 | 2/2022 | Murphy et al. | |
| 2023/0058138 A1* | 2/2023 | Covell ................ | H04L 63/1425 |

OTHER PUBLICATIONS

Naik et al, Securing Digital Identities in the Cloud by Selecting an Apposite Federated Identity Management from SAML, OAuth and OpenID Connect, May 12, 2017, IEEE, pp. 1-12. (Year: 2017).*

Bhargav-Spantzel, Abhilasha, Anna Squicciarini, and Elisa Bertino. "Privacy preserving multi-factor authentication with biometrics." Proceedings of the second ACM workshop on Digital identity management. 2006.

* cited by examiner

MULTI-FACTOR ENABLED ACCESS USING RANDOMLY SELECTED DIGITAL IDENTITY AUTHENTICATION FACTORS

TECHNICAL FIELD

The present disclosure relates generally to multi-factor access authentication using randomly selected digital identity factors.

BACKGROUND

Ensuring security of sensitive data or locations has been an ever-increasing concern. In many instances such security concerns involve assuring that a person seeking to gain access to a facility such as a building, military facility or campus is actually authorized to do so. In other situations, security concerns can include ensuring that a person attempting to gain access to a computer system, network, application or database is authorized to do so.

In some instances, authentication steps can be employed to determine that a person is authorized to access such a facility or computer system. This can involve predictable verification steps. As one example, an individual seeding access to a building can obtain a visitor badge and request a visitor's Wi-Fi account inside the secured building. In another example, contactless payment systems such as Apple Pay R can rely on fingerprints to authenticate an individual and may also include the use of a Personal Identification Number (PIN) or password.

The first example can be cumbersome and time consuming and requires that there be a person such as a receptionist who will enable access of the individual to the facility, and someone has to create a request for a guest WiFi access and open a door for access. In the second example, the device can be hacked since the authorization only relies on one or two predictable authentication factors.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
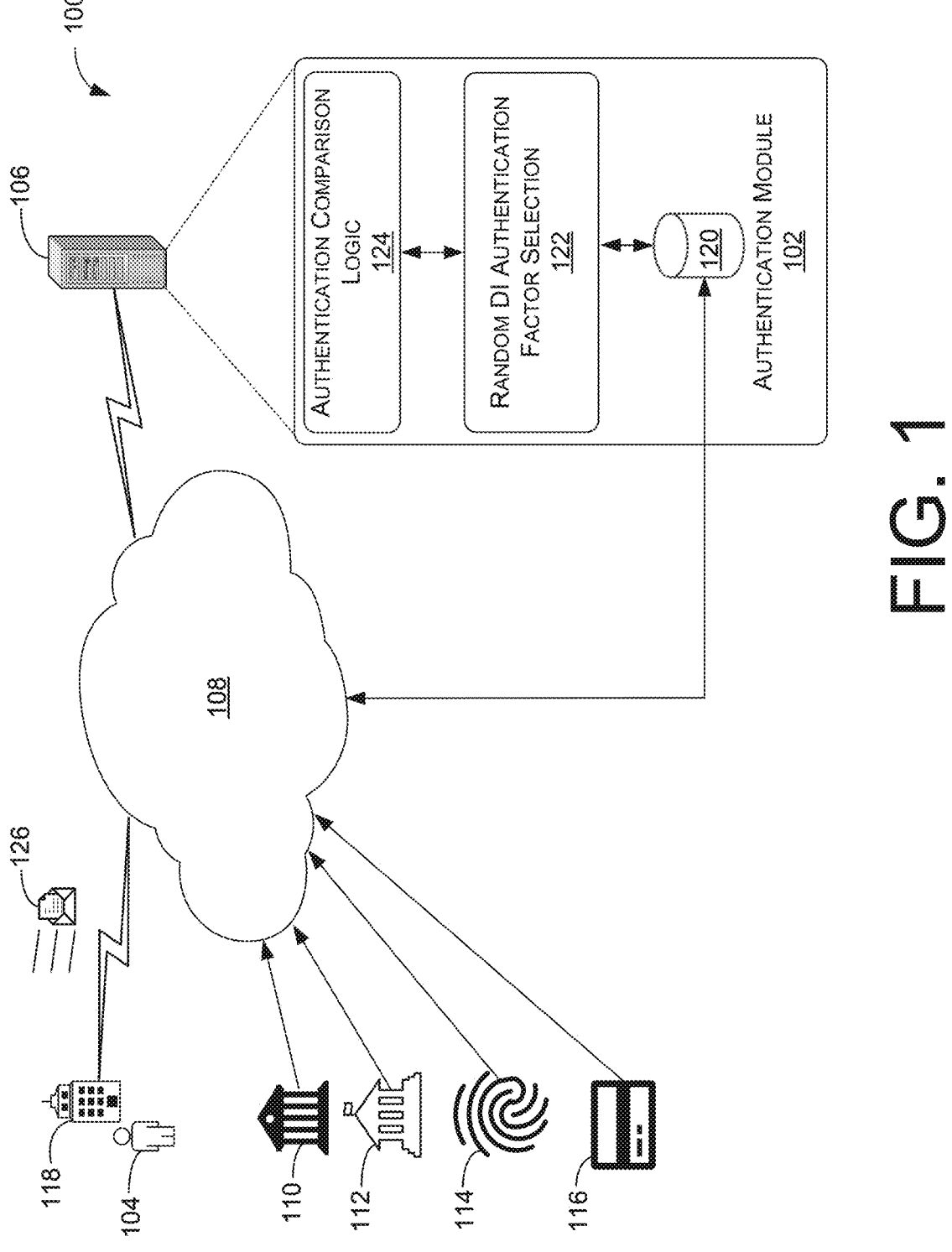
FIG. 1 illustrates a schematic diagram of a system according to an embodiment for authenticating user access to a facility.

This disclosure describes techniques for providing multi-factor authentication using randomly selected Digital Identity factors. Methods for providing authentication can include collecting a plurality of Digital Identity factors. A request for authentication is received, and two or more Digital Identity factors are selected from the plurality of Digital Identity factors. Information regarding a user seeking authorization is received, and the randomly selected Digital Identity factors are compared with the received information regarding the user seeking authentication. In response to determining that the received information matches the randomly selected Digital Identity factors, authorization can be granted to the user. In response to determining that the information does not match the randomly selected Digital Identity factors, authorization can be denied.

Additionally, the techniques described herein may be performed by a system and/or device having non-transitory computer-readable media storing computer-executable instructions that, when executed by one or more processors, performs the method described above.

Example Embodiments

In previous security authentication implementations authentication usually consists of a set of items either biometrics or passwords or a series of questions. Implementation of Digital identities allows enabling random pick authentication factors for verification items.

A Digital Identity is information used by computer systems to represent an external agent such as a person, organization, applications, or device. Digital identities allow access to services provided with computers to be automated and make it possible for computers to mediate relationships.

The use of Digital Identities is so widespread that many discussions refer to the entire collection of information generated by a person's online activity as a "Digital Identity.". This includes usernames, passwords, search history, birthdate, social security number, purchase history, etc. especially where that information is publicly available and not anonymized so that it can be used by others to discover that a person's identity. In this broader sense, a digital identity is a facet of a person's social identity and is also referred to as online identity. A person's digital identity can be linked to a civil or national identity and many jurisdictions have instituted national digital identity systems that provide digital identities to their citizenry.

A critical problem in cyberspace is knowing with whom one is interacting. Using only static identifiers such as password and email, there is no way to precisely determine the identity of a person in cyberspace, because this information can be stolen or used by many individuals acting as one. Digital identity based on dynamic entity relationships captured from behavioral history across multiple websites and mobile apps can verify or authenticate the identity as legitimate whereas divergence indicates an attempt to mask an identity. Data used for digital identity is generally anonymized to avoid privacy concerns. Because it is based on behavioral history, a Digital Identity is very hard to fake or steal.

The attributes of a digital identity are acquired and contain information about a subject, such as medical history, purchasing behavior, bank balance, age etc. Preferences retain a subject's choices such as favorite brand of shoes, or preferred currency. Traits are features of the subject that are inherent, such as eye color, nationality, place of birth. Although attributes of a subject can change easily, traits change slowly, if at all. A digital identity also has entity relationships derived from the devices, environment and locations from which an individual is active on the Internet.

Digital identities can be issued through digital certificates. These certificates contain data associated with a user and are issued with legal guarantees by recognized certification authorities. In order to assign a digital representation to an entity, the attributing party must trust that the claim of an attribute (such as a name, location, role as an employee, or age) is correct and associated with the person or thing presenting the attribute. Conversely, the individual claiming an attribute may only grant selective access to its information. In this way, digital identity is better understood as a particular viewpoint within a mutually agreed relationship than as an objective property.

Authentication is the assurance of the identity of one entity to another. It is a key aspect of digital trust. In general, business-to-business authentication is designed for security, but user-to-business authentication is designed for simplicity. Authentication techniques include the presentation of a unique object such as a bank credit card, the provision of confidential information such as a password or the answer to a pre-arranged question, the confirmation of ownership of an email address, and more robust but costly techniques using encryption. Physical authentication techniques include iris scanning, hand-printing, and voice-printing. These techniques are called biometrics. The use of both static identifiers (e.g. username and password) and personal unique attributes such as biometrics is called multi-factor authentication and is more secure than the use of one component alone.

While technological progress in the authentication continues to evolve, these systems do not entirely prevent aliases from being used. The introduction of strong authentication for online payment transactions can link a verified person to an account, where such person has been identified in accordance with established requirements prior to an account being opened. Verifying a person opening an account online typically requires a form of device binding to the credentials being used. This verifies that the device that stands in for a person on the Internet is actually the individual's device and not the device of someone simply claiming to be the individual. The concept of reliance authentication makes use of pre-existing accounts to piggyback further services upon those accounts, providing that the original source is reliable. The concept of reliability comes from various anti-money laundering and counter-terrorism funding legislation where second parties may place reliance on the customer due diligence process of the first party, where the first part is, for example, a financial institution.

Authorization is the determination of an entity that controls resources that the authenticated party can access those resources. Authorization depends on authentication, because authorization requires that the critical attribute (i.e, the attribute that determines the authorizer's decision) must be verified. For example, authorization on a credit card gives access to the resources owned by a merchant. Authorization of an employed can provide the employee with access to network resources such as printers, files or software. For example, a database management system might be designed so as to provide certain specified individuals with the ability to retrieve information from a database but not the ability to change data stored in the database, while giving other individuals the ability to change data. Valid online authorization requires analysis of information related to the digital event including devices and environmental variables. These are generally derived from the data exchanged between a device and a business server over the Internet.

Digital Identity requires digital identifiers which can be strings or tokens that are unique within a given scope (globally or locally within a specific domain, community, directory, application, etc.). Identifiers may be classified as omnidirectional or unidirectional. Omnidirectional identifiers are public and easily discoverable, whereas unidirectional identifiers are intended to be private and used only in the context of a specific identity relationship.

Identifiers may also be classified as resolvable or non-resolvable. Resolvable identifiers, such as a domain name or email address, may be easily dereferenced into the entity they represent, or some current state data providing relevant attributes of that entity. Non-resolvable identifiers, such as a person's real name, or the name of a subject or topic, can be compared for equivalence but are not otherwise machine-understandable.

There can be many different schemes and formats for Digital Identifiers for websites on the Internet. OpenID and Light-weight Identity are two web authentication protocols that use standard HTTP URIs (often called URLs). A Uniform Resource Name is a persistent, location-independent identifier assigned within the defined namespace.

FIG. 1 shows a schematic illustration of a system 100 for random, multi-factor authorization. The system includes an Authentication Module 102, which can include logic and/or circuitry for determining whether to authenticate a user 104. In one embodiment, the Authentication Module 102 can reside on one or more servers 106. The server or servers 106 can be in communication with or connected to a network such as a cloud network 108. In one embodiment, the network 108 can be a Wide Area Network (WAN) or the Internet. In other embodiments, the network 108 can be a Local Area Network (LAN), Enterprise Network, or could be a Data Center. The user 104 can be a person having a digital identity which can include public or privately available data regarding the user. In one embodiment, this digital identity data can be stored in or accessible from the network 108. In various embodiments, the digital identity data can include financial data 110 such as, but not limited to, bank records, credit history, purchase history, etc. The digital identity data can also include government data 112 such as, but not limited to, social security number, licensing credential information, government records such as title records indicating residence or real property owned by the user, security clearance as well as various other government data regarding the user 104. In other embodiments, the digital identity data can include biometric data 114. The biometric data 114 could include data such as, but not limited to, fingerprint data, iris scan data, facial recognition, blood type, eye color, height, DNA, as well as many other types of biometric data regarding the user 104. In other embodiments, the digital identity data can include identification information 116 such as, but not limited to, driver's license or government identification (ID), military ID, student ID, employee badge, etc. The digital identity information can include other types of data or information as well. As mentioned above, the digital identity information can be stored in the network 108, which may be the Internet or other Wide Area Network, or could be a Local Area Network, Enterprise Network or Data Center.

In the embodiment illustrated with reference to FIG. 1, the user 104 wishes to access a facility 118. The facility 118 could be, for example, an industrial complex, office building, military facility, government building, etc. A request for authentication of the user 104 is sent to the one or more servers 106 on which the Authentication Module 102 resides. The request can be sent to the one or more servers 106 via the network 108. As mentioned above, in one embodiment, the network 108 can be the Internet or other Wide Area Network. In one embodiment, the network 108 could be an enterprise network or Data Center which could in one embodiment reside within the facility 118.

In one embodiment, the Authentication Module can access the network to retrieve and collect a variety of digital data factors regarding the user 104. In one embodiment, the retrieved digital identity information can be stored in a database or computer storage 120. In one embodiment, the database 120 can reside in computer storage on the one or more servers 106. In another embodiment, the digital identity information regarding the user can be stored remotely from the one or more servers 106, such as in the cloud (e.g. network 108).

The Authentication Module 102 can include a Random Authentication Factor Selection Logic 122, which can randomly select multiple Digital Identity factors from the various Digital Authentication factors stored in the database 120. In another embodiment, the Random Authentication Factor Selection Logic 122 can retrieve the Random Digital Identity factors directly from an outside source, such as from the network 108. This could include retrieving the records from publicly or privately available documents such as bank records, government records, etc.

The Authentication Module 102 can send a request for user related information to the user or device associated with the user 104. The request can be sent from the one or more servers 106 to a device associated with the user 104. The device associated with the user 104 could be a device possessed by the user. In one embodiment, the request can be sent via one or more wired or wireless networks such as the network 108. The device associated with the user could a device possessed by the user 104, such as a cell phone or connected, smart device, such as a fitness tracker, smart watch, a smart, connected vehicle or other Internet of Things (IoT) device. The device associated with the user 104 could also be a device associated with and or connected with the facility 118 to which the user 104 wishes to gain entry. This could be, for example, a keypad for entering data or an input device capable of determining biometric information regarding the user 104, such as but not limited to, a fingerprint scanner, camera with facial recognition, microphone with voice recognition logic, retina scanner, etc. In another example, the device associated with the facility could also include a device for recognizing a vehicle (not shown) in which the user 104 is traveling. One or more features of the vehicle can be compared with government or other records to determine one or more digital identity factors of the user 104, such as by checking registration records or other records associated with a Department of Motor Vehicles.

In response to the request, information regarding one or more Digital Identity Factors (reply 126) is sent to and received by the Authentication Module and one or more servers 106. The reply can be from input directly provided by the human user 104 such as a by entering a password, user ID, driver's license, military or other ID information, fingerprint scan, date of birth, or any other of an unlimited number of information factors. In another embodiment, the reply 126 can be entirely invisible to the user 104. For example, the query for Digital Identity information can be sent to and processed by a device associated with the user without the user's knowledge. Not only would the human user 104 be unaware of what randomly selected Digital Identity factors are being queried, the human user 104 could be unaware that they are being queried at all. The human user 104, could be unaware that the reply 126 is being sent. For example, a device associated with the facility 118 could scan a license-plate associated with a vehicle in which the user 104 is traveling, or the query could be sent directly to the vehicle itself in the case where the vehicle is a connected, smart vehicle. The digital information could also be retrieved from a device associated with the user such as a cell phone, smart watch, RFID tag, or any number of other devices without requiring the user to directly provide information.

The Digital Identity information provided by the reply 126 is processed by the Authentication Comparison Logic 124. The Authentication Comparison Logic compares the user information of the reply 126 with the Digital Identity information that is either stored in the computer storage 120 or which is retrieved directly from a source such as within the network 108. If the information in the reply 126 matches the randomly selected digital identity factor, then this can be interpreted as a step toward granting authorization to the user 104. If the information in the reply 126 does not match the randomly selected digital identity factor, then this can be interpreted as a step toward denying authorization to the user 126.

This processes of: (1) randomly selecting a digital identity factor: (2) sending a request to a user or user associated device: (3) receiving a reply 126; and (4) comparing information in the reply 126 with the randomly selected digital identity factor can be performed multiple times to provide a random multi-factor authentication using randomly selected multiple Digital Identity factors. In one embodiment, the processes of determining whether to grant authorization based randomly selected Digital Identity factors can be performed two or more times. In other embodiments, the process can be performed many more times. This can be especially applicable to a situation as described above, wherein the query and reply are invisible to the user and the user will not be burdened by providing a multitude of Digital Identity replies.

In one embodiment, algorithms such as artificial intelligence algorithms may be employed in determining whether to grant authorization based on the matching of replies with the randomly selected Digital Identity factors. For example, if not all of the replies match all of the randomly selected Digital Identity factors but several do, a determination can be made as to whether it is safe to grant authorization. In one embodiment, this determination can include an assessment of the criticality of security requirements for a given situation. For example, access to a business facility might have a different security risk than access to a military facility or a facility housing classified information.

Figure 2:
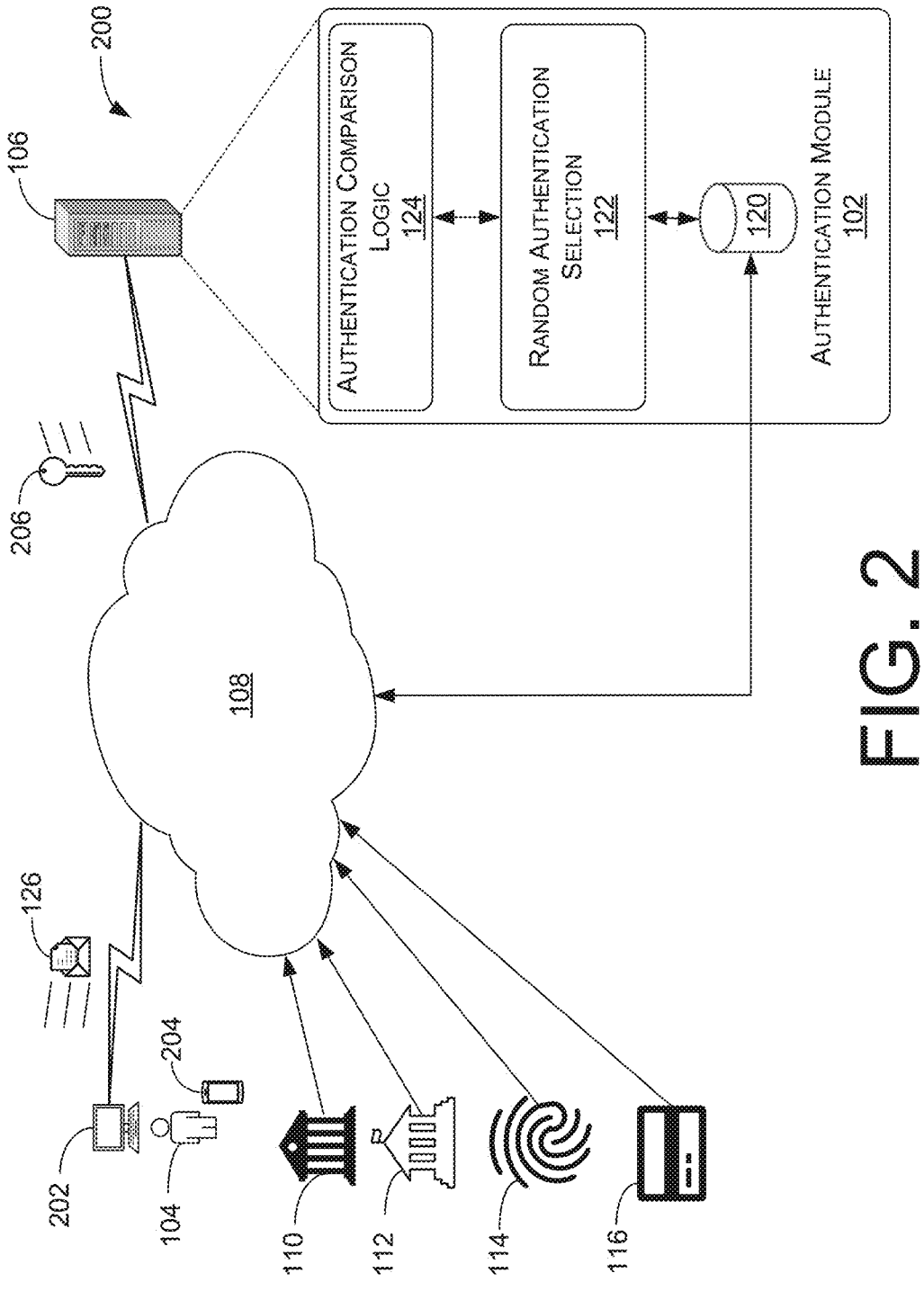
FIG. 2 illustrates a schematic diagram of a system according to an embodiment for authenticating user access to a computer device or network.

FIG. 2 shows a schematic illustration of a system for providing randomly selected multifactor authentication according to another embodiment. In the embodiment shown in FIG. 2, rather than accessing a physical facility, a user 104 is attempting to access a computer device or system 202, which will be referred to generally as a device 202. The device 202 could be a computer or computer network such as a company or government computer network. The device 202 could also be an application of a computer, such as a financial or medical network. In another embodiment, the device 202 could be an application residing on or associated with a device owned and controlled by the user. For example, the device 202 could be an application on the user's 104 cell phone, computer, laptop, Internet of Things (IoT) device, etc. The device 202 could also encompass a remote application or website such as a financial institution or medical application that is remote from the user, and which the user 104 is attempting to access using a device owned by the user, such as the user's cell phone, laptop, desktop, personal digital assistant, etc. The device 202 could also be a device such as a kiosk and the user 104 could be attempting to access systems or applications resident on or remote from the kiosk.

As with the previously described embodiments, a plurality of digital identity factors can be associated with the user 104, all or some of which can reside on and be accessed by the network 108, or on a device such as a cell phone, smart device fitness tracker etc. possessed by the user 104. For example, there can be financial data 110 such as band records, spending habits, etc. associated with the user 104. The Digital Identity factors can also include government data or records 112. Such information could include social security information, tax records, property title or county records, etc. The Digital Identity factors could also include biometric such as, but not limited to fingerprint, facial recognition, voice recognition, retina scan, etc. The Digital Identity factor information could also include ID information 116 such as driver's license, military ID, etc.

Whereas the previously described embodiment related to a user attempting to access a facility, the embodiment described with reference to FIG. 2 relates to a situation wherein the user 104 is attempting to gain access to a computer device, computer system, computer network, computer software, computer memory, database, etc. referred to herein generally as device 202. When the user 104 attempts to gain access to the device 202 an authentication request is sent to the Authentication Module 102, which as described above can reside on one or more servers 106 which can be connected with the network 108. In one embodiment, the request can be sent via the network 108 with which both the device 202 and the one or more servers 106 are connected or in communication.

The Random Authentication Selection logic 122 randomly selects multiple Digital Identity Authentication Factors. The randomly selected Digital Identity Authentication factors can be selected from a compiled database 120 of multiple Digital Identity authentication factors, or could be retrieved directly from an outside source, such as the network 108, which in one embodiment could be the Internet. The Authentication Module 102 can send a request to the user 104 for information related to the randomly selected multiple authentication factors. In one embodiment, the request can be sent from the one or more servers 106 to the device 202 via the network 108. In another embodiment, the request can be sent from the one or more servers 106 to a device 204 associated with the user 104, such as, but not limited to a cell phone, laptop, fitness tracker. Internet of Things (IoT) device, etc.

The user 104, device 202, or user related device 204 can then send a reply 126 back to the one or more servers 106 and Authentication Module 102 via the network 108. Upon receiving the reply 126. Authentication Comparison Logic 124 of the Authentication Module 102 compares the information in the reply 126 with the randomly selected Digital Identification factors. If the information in the reply matches the randomly selected Digital Authentication factor, then this indicates a single level of authentication. The matching of randomly selected Digital Authentication factors with information in one or more replies is performed until multiple levels of authentication have been made. When a desired, number of randomly selected Digital Authentication factors have been determined to match a desired number of information factors one or more replies 126, then a determination to authenticate the user 104 can be made. In one embodiment, if a determination is made to grant authentication of the user 104, a cryptographic key 206 can be sent to the device 202 to allow access. In one embodiment, the cryptographic key 206 can be sent from the one or more servers 106 to the device 202 via the network 108. In other embodiments, the cryptographic key 206 can be sent from another server cryptographic key agent (not shown), which may be connected with the network 108. If one or more information factors in the reply are determined to not match the randomly selected Digital Authentication factors, then a determination can be made not to grant authentication.

Figure 3:
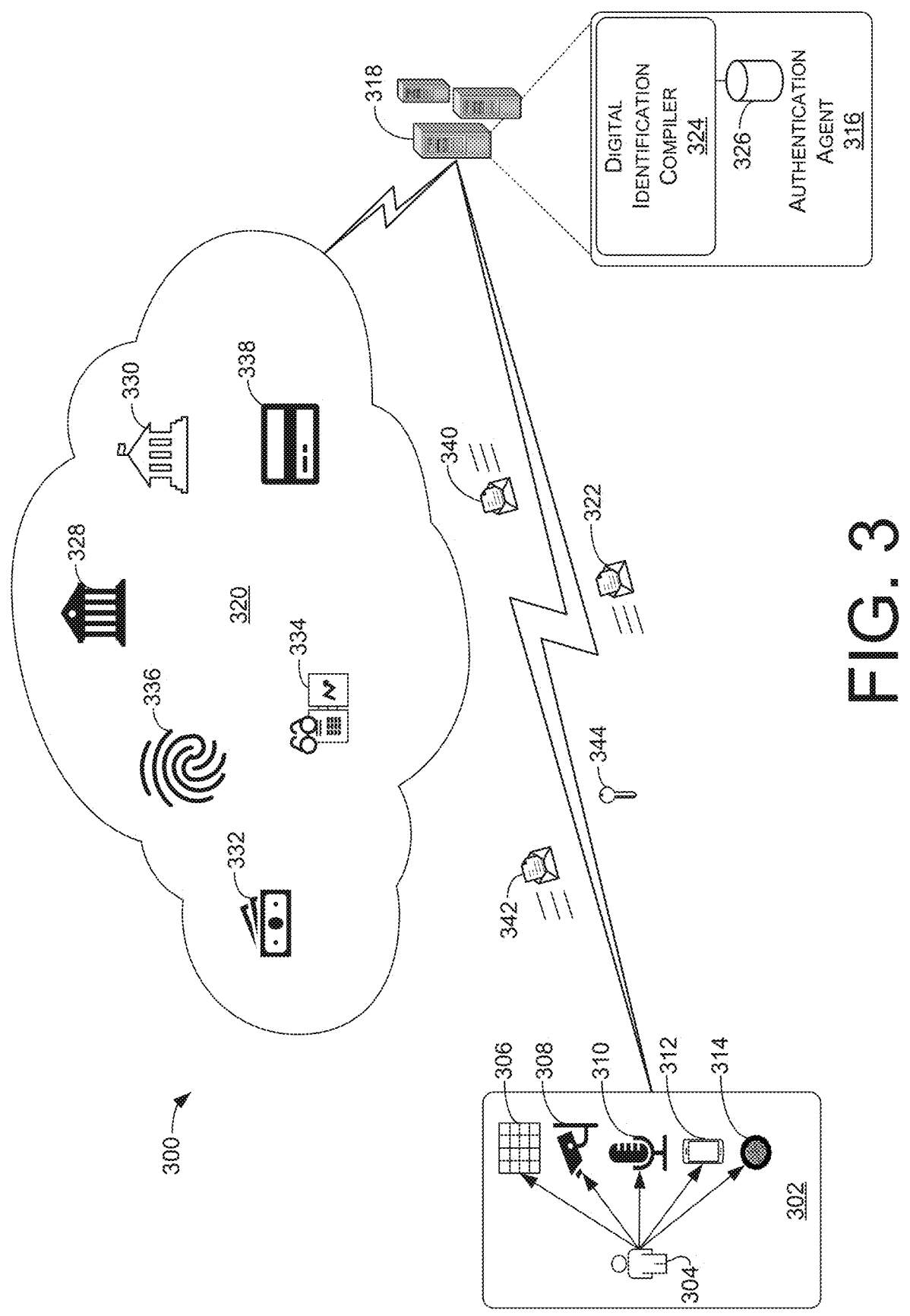
FIG. 3 illustrates a schematic diagram of a system according to another embodiment for authenticating user access.

FIG. 3 is a schematic diagram illustrating a multi-factor authentication system 300 according to an embodiment. The multi-factor authentication can include a user environment 302, that can include a human user 304 as well as one or more electronic user input interfaces 306, 308, 310, 312, 314. The system also includes a Random Multi-Factor Digital Identification Agent, referred to herein as Authentication Agent 316. In one embodiment, the Authentication Agent 316 can reside on one or more servers 318 or could be a cloud-based system residing on a network 320. In one embodiment, the network can be a Wide Area Network (WAN) such as the Internet. In another embodiment, the network 320 can be a Local Area Network (LAN), enterprise network or data center.

A request for authentication 322 can be sent from the user environment 302 to the Authentication Agent 316. In one embodiment, the request for authentication 322 can be sent to the Authentication Agent 316 via wired or wireless communication with the one or more servers 318 on which the Authentication Agent 316 resides. In on embodiment, the human user 304 can be requesting access to a facility such as a building, military facility, business campus, school campus, etc. In another embodiment, the user 304 can be requesting access to an electronic device or devices such as a computer, computer network, computer application, computer database, etc.

The user environment can include one or more electronic devices such as devices 306, 308, 310, 312, 314 for receiving information or data from or about the human user 304. Example of such electronic devices can include a keyboard or keypad 306 for receiving information from the user 304. Such information can include, for example, identification information such as name, user id, passwords, answers to identification questions such as data of birth or other digital identity information. The input devices could also include a camera device 308. The camera device 308 could be one or more of a variety of devices such as a still camera or video camera and could include capabilities such as facial recognition, retina scan, etc. The user environment could also include a microphone 310 through which information about the user 304 could be received. This could include auditory information recited by the user 304 or could include other identifying information such as voice recognition. The devices can also include a device 312 possessed by the user 304, such as a cell phone, laptop, personal digital assistant, etc. The user owned device 312 could be used to enter data, such as by responding to a text or email. In another embodiment, the user owned device 312 could provide identifying information without direct input from the user 304, or even without the user being aware that such device is providing information, such as by providing geographic location (GPS) information, sim card information, recent purchase history, etc. The electric devices could also include a device 314 for receiving or providing biometric data, such as fingerprint, retina scan, etc.

As discussed above, the user 304 can submit a request for authentication 322. This request can include information regarding the identity of the purporting to be, such as name, preconfigured username, ID number, social security number, etc. This identifying information is received by the Authentication Agent 316. The Authentication Agent randomly selects a plurality of Digital Identity factors associated with person identified by the personal identification information in the authentic request. In one embodiment, the Digital Identification factors can be selected from a Digital Identification compiler 324 which may include computer memory or a database 326 for storing Digital Identity information.

In one embodiment, the Digital Identification Compiler 324 can retrieve Digital Identity factors from the network 320. The Digital Identification factors can include banking information 328, such as bank account information or government records 330 such as social security number, real estate title records, etc. The Digital Identity factor information could also include financial information such as spending history or spending habits 332 or various accounting information 334. The Digital Identity information could also include biometric data 336, such as fingerprint information, facial recognition information or voice recognition information or could include ID information 338 such as driver's license number, military ID information etc. The Digital Identity factors could include other types of data as well which may not be listed in the examples above.

The Authentication Agent 316 randomly selects multiple Digital Identity factors from the Digital Identification Compiler 324 and sends a request for data 340 to the user environment 302. In response to the request for data 340, the user environment 302 can generate a response 342, and send the response 342 back to the Authentication Agent 316. The response 342 includes information related to the randomly selected plurality of Digital Identification factors. In one embodiment, the response 342 to can include information provided directly by the user 304 input through one of the electronic devices 306, 308, 310, 312, 314, such as by providing a password through the keyboard or keypad 306, providing a fingerprint through the biometric reader 314, etc. However, the response 342 can also include Digital Identity information provided by the user environment 302 without direct input from the human user 304 and possibly without the knowledge of the human user. For example, the response 342 can include information retrieved directly from a user owned device 312 such as from a SIM card of a cell phone 312 or information from another user owned device. The response could include facial recognition information collected by the camera. The response 342 could include Digital Identity information from various other inputs as well, such as voice recognition information from a microphone 310, retina scan information from a camera 308 identifying information such as license, social security, military ID or random authorization code input through a device such as a keypad 306 or via a user owned device.

The Authentication Agent 316 can include logic and/or circuitry that can compare the information in the response 342 with the randomly selected Digital Identity factors selected from the network 320, which may also be stored in and selected from the database 326. If the information provided in the response 342 does not match the randomly selected Digital Identity factors, then access can be denied. On the other hand, if the identification factors of the response 342 match the randomly selected Digital Identification factors selected by the Authentication Agent 316 from the network 320 and compiled by the Digital Identification Compiler 324, then the Authentication Agent can determine to allow authentication of the user 304. In one embodiment, a cryptographic key 344 can be sent to the user environment 302. In one embodiment, the cryptographic key 344 can allow the user 304 to have access to a device, computer system, computer network, computer storage, computer application etc. as described above. In another embodiment, the cryptographic key 344 can allow the user to access a building, facility, etc. as described above.

Different circumstances may require varying levels of security. In situations requiring a very high level of security, many randomly selected digital identity factors may be selected and compared against responses in the response 342. In situations requiring a high level of security, authentication of the user 304 may only be provided if all of the factors in the response 342 match all of the digital identity factors randomly selected by the Authentication Agent 316. In situations requiring less strict security, a certain number of authentication factors in the reply may be allowed to not match the selected Digital Identity factors while still allowing authentication of the user 304. By way of example, in a lower-level security situation, 4 Digital Identity factors may be selected and if three Digital Identification factors match, but one does not, authentication may be allowed. Situations requiring less strict security may also require less randomly selected Digital Identity factors to be used than might be used in a situation requiring higher security.

Figure 4:
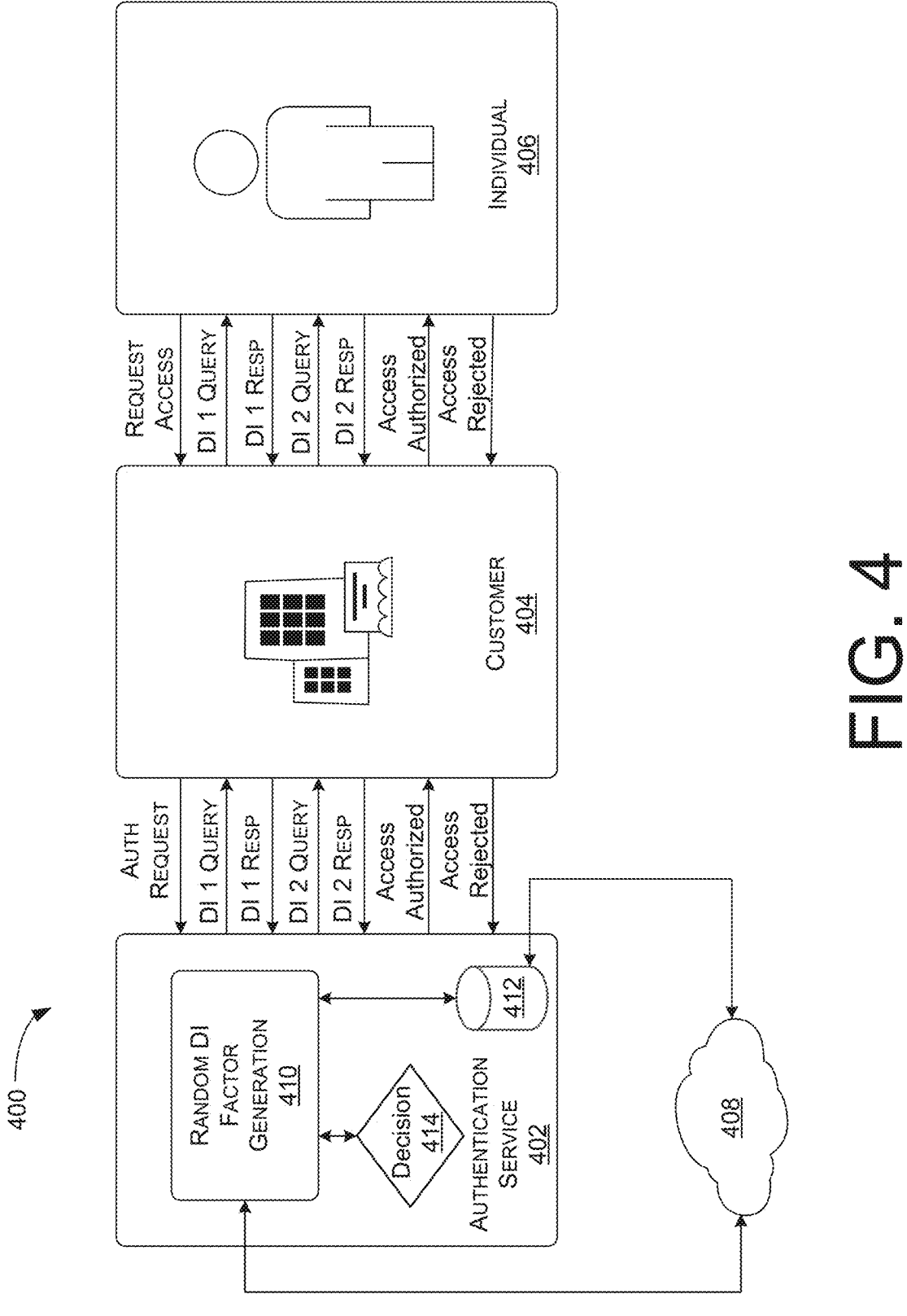
FIG. 4 illustrates a schematic diagram of a security service according to an embodiment.

FIG. 4 is a schematic diagram illustrating a system 400 for providing authentication services. FIG. 4 shows a relationship between an Authentication Service 402, a customer 404 and an individual user 406. In one embodiment, the Authentication Service 402 can be a remote or cloud-based security service. In other embodiments, the Authentication Service 402 can reside within and provide security to an entity or network such as an enterprise network or datacenter. The customer 404 can be an entity such as a business, enterprise, military entity or facility, financial entity such as a bank or investment firm or any number of other types of entities requiring security services with regard to access by human users. The customer 404 can include computer systems (not shown) such as a computer server or computer network such as an enterprise network or datacenter. The Individual 406 can be one or more human users seeking access to a facility, computer device, network, computer memory, computer application etc. associated with the Customer 404.

The Authentication Service 402 can include a Random Digital Identification Factor Generation module 410, which can include logic and or circuitry for randomly selecting Digital Identification factors for performing random, multi-factor authentication of the user 406. In one embodiment, the Digital Identification factors can be retrieved from a network 408. In one embodiment, the network 408 can be a Wide Area Network. In one embodiment, the network 408 can be the Internet, where various Digital Identity factors regarding the user 406 can be found and retrieved. In one embodiment, the Random Digital Identification Generation Module 410 can retrieve the Digital Identification factors from the network 408 and store the Digital Identification factors in computer memory or a database 412 for later retrieval and processing by the Random Digital Identification Factor Module 410.

In another embodiment, Digital Identification factors regarding the Individual user 406 can be previously received from either the Individual user 406, from the Customer 404 or from both the Individual user 406 and the Customer 404 and the previously received Digital Identification factors can be stored in the computer memory or database 412. For example, the Individual 406 upon registering with the Customer 404 can provide personal Digital Identity information. The Customer 404 can forward this Digital Identity information to the Authentication Service 402, which can store this Digital Identity information in the computer memory or database 412 for future use in authenticating the Individual 406.

With continued reference to FIG. 4, when an Individual 406 requires access to an entity controlled by the Customer 404, the Individual 406 sends a Request for Access to the Customer 404. This Request for Access can be a request to access a computer system, computer network, computer application, computer memory, etc. The Request for Access can also be a request to access a physical facility under jurisdiction of the Customer, such as a building, campus, or other facility.

In response to receiving the Request for Access from the Individual 406, the Customer 404 can send an Authorization Request to the Authentication Service 402. In response to receiving the Authorization Request from the Customer 404, the Random Digital Identification Factor Generation Module 410, randomly selects a plurality of Digital Identification factors applicable to the Individual 406 from the computer memory or database 412. In another embodiment, the Random Digital Identification Factor Generation Module 410 can retrieve the Digital Identification factors applicable to the Individual 406 directly from the network 408.

The Authentication Service 402 sends a first Digital Identity Query (DI 1 Query) to the customer 404. The customer 404 forwards the DI 1 Query to the Individual 406. The DI 1 Query can be sent directly to the human Individual 406 or can be sent to a device associated with an environment of the Individual 406. For example, the DI 1 Query can be sent to device in possession of the Individual User, such as a cell phone, data tracker Internet of Things (IoT) device, etc. The DI 1 Query can also be sent to a device in an environment of the Individual 406, such as a camera, retina scanner, microphone, etc. In one embodiment, the DI 1 Query can be sent to such a device without knowledge of the Individual 406.

The Individual 406 or a device associated with an environment of the Individual 406 sends a reply to the DI 1 query (DI 1 Resp) to the Customer 404. The DI 1 response can be input and sent directly by the human Individual 406 or can be automatically sent by a device associated with the Individual 406 of environment of the Individual 406. The Customer, then sends forwards the DI 1 Response (DI 1 Resp) to the Authentication Service 402.

This process can be repeated multiple times to provide multi-factor authorization using randomly selected Digital Identity factors. For example, a second Digital Identification Query (DI 2 Query) including a second randomly selected Digital Identification factor associated with the Individual 406 can be sent to the Customer 404. The Customer 404 can forward the DI 2 Query to the Individual 406 or an environment or device associated with the Individual 406. The user can send a response DI 2 Resp to the Customer 404, and the Customer 404 can forward the response DI 2 to the Authentication Service 402. This process can be repeated as many times as desired depending upon the level of security required.

The Authentication Service includes Decision logic 414 that can compare the Digital Identification Factors of the queries (DI 1 Query, DI 2 Query . . . DI n Query) with the Digital Identification information of the Responses (DI 1 Resp, DI 2 Resp . . . DI n Resp) to determine whether the DI factors of the queries match the DI factors of the responses. If the responses match the queries (or if enough of the responses match enough of the queries), the Decision logic 414 can make a determination to Authorize Access (Access Authorized). This grant of authorization can be sent to the Customer 404. The grant of Authorization (Access Authorized) can be sent to an environment or device associated with the Individual 406 to allow the Individual 406 to gain access to the facility, building, computer system, etc.

If the Decision logic 414 determines that the queries do not match the responses (or an insufficient number of queries match the responses), then the Decision logic 414 can determine to reject authorization. A notification of rejected access (Access Rejected) can be sent to the Customer 404. In one embodiment, a notice of rejected access (Access Rejected) can be forwarded from the Customer 404 to the individual 406.

Figure 5A:
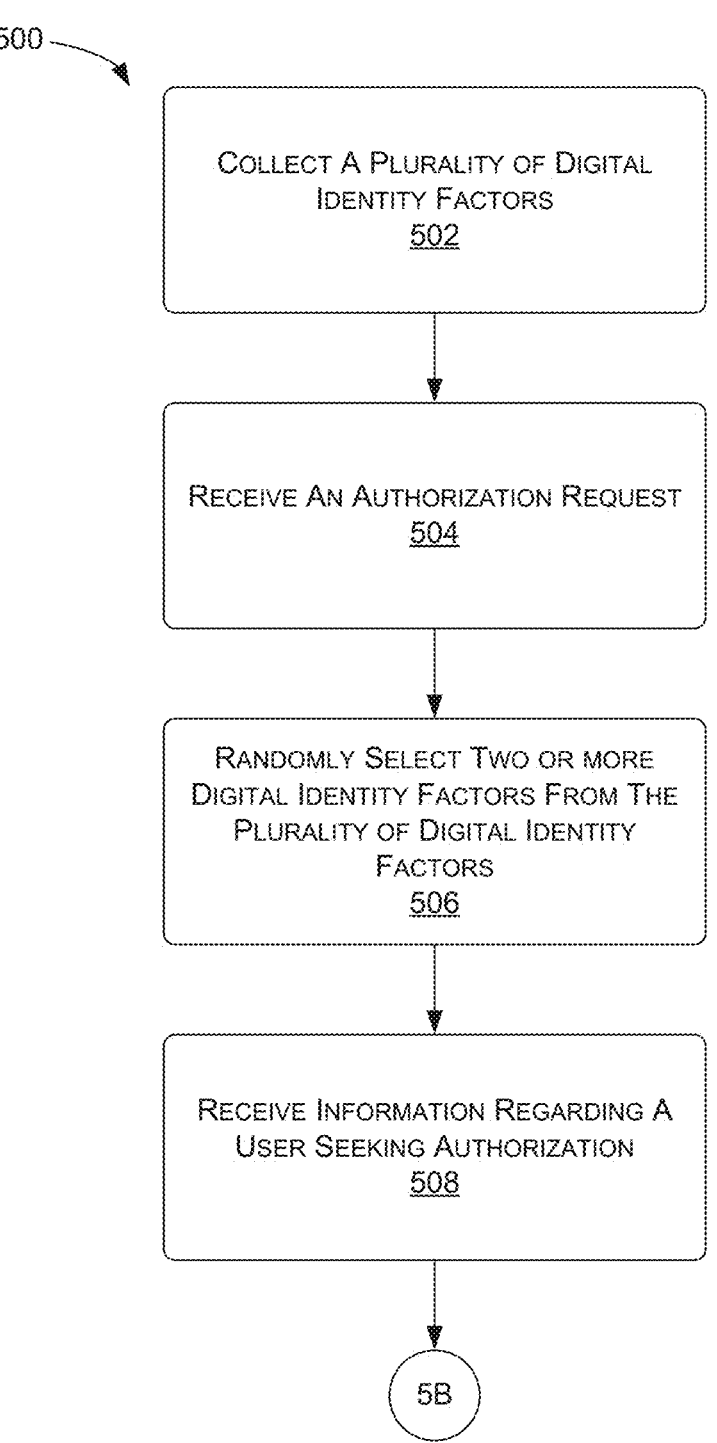
FIGS. 5A-5B illustrate a flow diagram for a method according to an embodiment for authenticating a user.
Figure 5B:
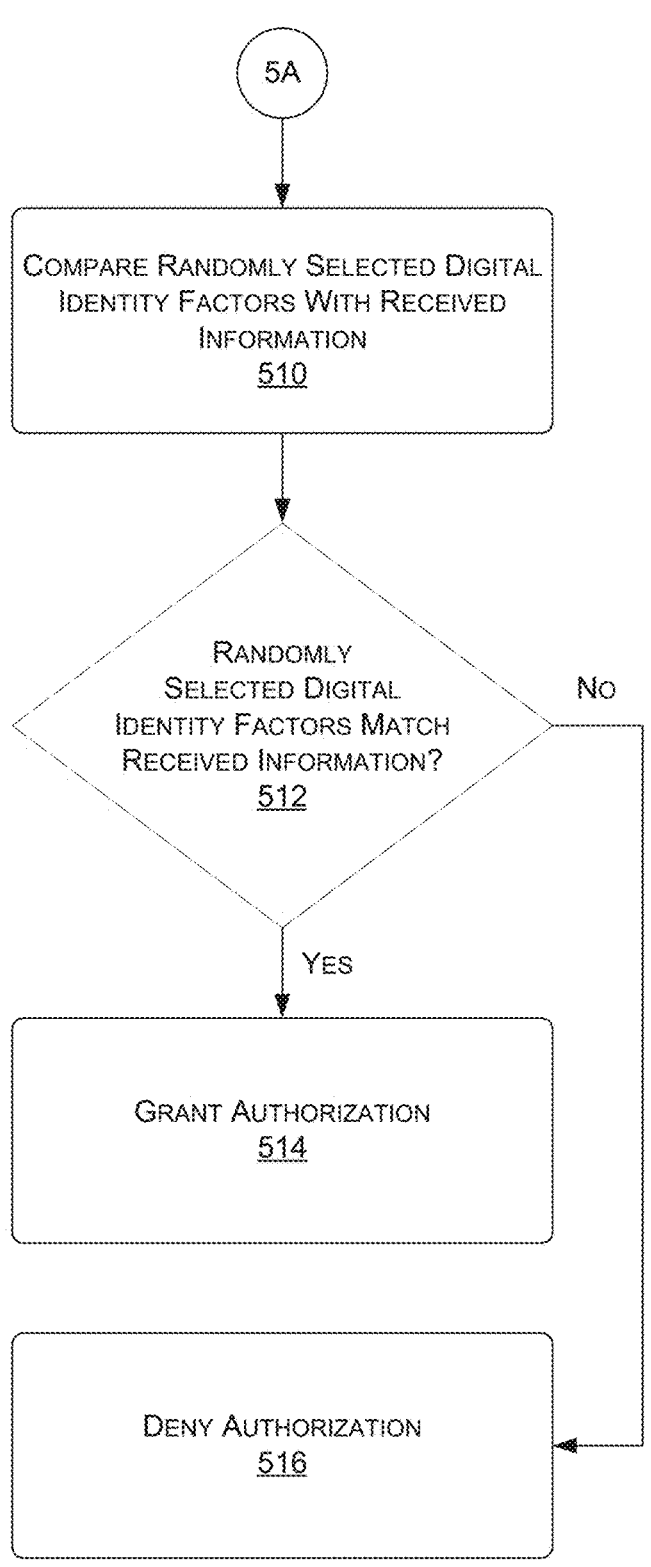

FIGS. 5A and 5B illustrate flow diagrams of an example method 500 that illustrate aspects of the functions performed at least partly by the devices in the distributed application architecture as described in FIGS. 1-4. The logical operations described herein with respect to FIGS. 5A and 5B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A and 5B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different components.

With reference to FIG. 5A, the method 500 includes collecting a plurality of Digital Identity factors regarding an individual 502. The Digital Identity factors can be collected from public or private sources such as from the Internet or another external or internal network. In another embodiment, the Digital Identity factors can be previously collected from the Individual or from a customer seeking authentication services such as a business enterprise, government or military organization, etc. In another embodiment, the Digital Identity factors can be retrieved at the time the authentication request from public or private sources or from a customer entity seeking authentication services.

A request for authorization is received 504. The request for authorization can be received from a customer such as business, government entity, military entity, etc, or could be received from a user attempting to gain access to a computer system, facility, building, etc. In one embodiment, the request for authorization can be received from a customer entity that has forwarded the request from a human user or individual.

In response to receiving a request for authorization, two or more Digital Identity factors are randomly selected from a plurality of collected Digital Identity factors 506. The plurality of Digital Identity factors can include many possible Digital Identity factors associated with the individual attempting to gain authorization. The number of randomly selected digital identity factors can vary depending upon the level of security required. For example, in a lower security threat situation, only two or three Digital Identity factors might be used, whereas many more randomly selected Digital Identity factors might be selected in a situation requiring a higher level of security. In one embodiment, the Digital Identity factors include biometric data and non-biometric data. In one embodiment, the Digital Identity factors can include publicly available records. The user is then prompted to authorize using the randomly selected digital identity factors.

Information regarding a user or individual seeking authorization is received 508. The information regarding the user can be part of a reply from the user in response to a query sent to the user, wherein the query requests information related to the randomly selected digital identity factors. The reply could be received directly from the user or could be received from a customer entity that received the information from the user. In one embodiment, the information can include personal identification information such as a driver's license, military identification number, or social security number. The information regarding the user could be provided directly from the human user or could be received from a device associated with a user environment. For example, the information could be received from a device owned or controlled by the user such as a cell phone or other electronic device. For example, the information could include one or more of a MAC, serial number, device identifier, device Bluetooth connectivity information, fitness tracker information USB key, or could include third party device information. In addition, the information could be received with or without knowledge of the human user.

With reference now to FIG. 5B, the randomly selected Digital Identity factors are compared with received information regarding the user 510. A determination 512 is made as to whether the randomly selected Digital Identity factors match the received information regarding the user. In response to determining that the randomly selected Digital Identity factors match the received information regarding the user, authorization of the user can be granted 514. On the other hand, in response to determining that the Randomly selected Digital Identity factors do not match the received information regarding the user, then authorization can be denied 516. In some embodiments, authorization can be granted even if a certain amount or percentage of the randomly selected Digital Identity factors do not match the received information regarding the user but many others do match. For example, if ten Digital Identification factors are used and one or two Digital Identity factors do not match the received information, a decision can be made to grant authorization even not all of the Digital Identity factors do not match. This decision can depend on factors such as the required level of security for a given situation.

Figure 6:
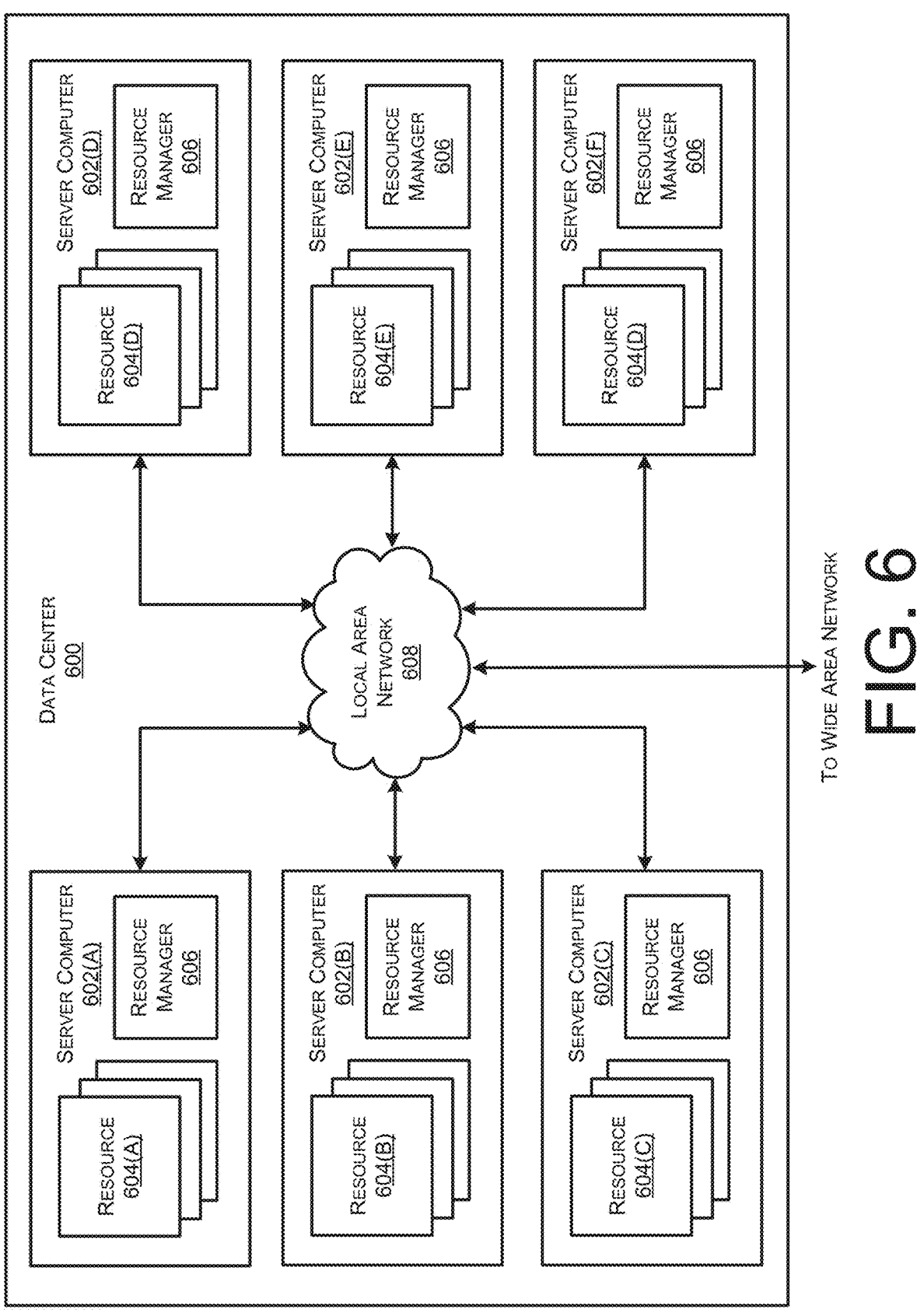
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more application containers and/or virtual machines to perform techniques described herein.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
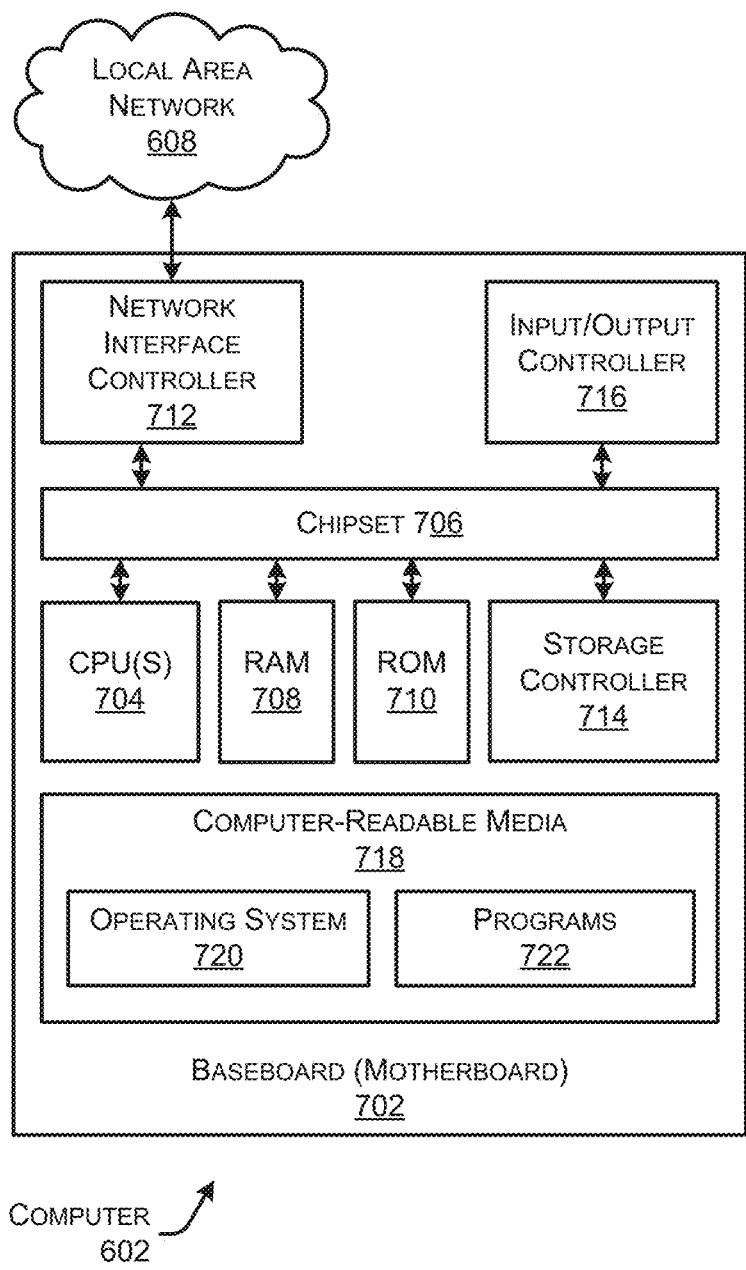
FIG. 7 is a computer architecture diagram showing an illustrative computer hardware architecture for implementing a computing device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical server 106 described herein, and may comprise networked devices such as servers, switches, routers, hubs, bridges, gateways, modems, repeaters, access points, etc.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608 (and/or 108). It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 820, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by devices in the distributed application architecture 102, and or any components included therein, may be supported by one or more devices similar to computer 702. Stated otherwise, some or all of the operations performed by the systems 100, 200, 300, 400, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5B. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more of a router, load balancer and/or server 106, 318. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by the router, load balancer and/or server 106, 318. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for providing a distributed application load-balancing architecture that is capable of supporting multipath transport protocol. That is, the computer 602 may comprise any one of the routers, load balancers, and/or servers 106, 318. The programs 722 may comprise any type of program that cause the computer 602 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method authenticating access, the method comprising:

receiving an authorization request to authorize a user;

collecting, by an identity system, first digital identity data and second digital identity data representing network-based behaviors of the user across one or more networks;

generating, by the identity system, a digital identity of the user, wherein the digital identity includes one or more of a medical history of the user, a purchasing behavior of the user, a bank balance of the user, or an age of the user;

generating, by the identity system, a digital identity of the user, the digital identity of the user comprising an online identity of the user determined based at least in part on the network-based behaviors of the user across one or more networks;

randomly selecting, from the digital identity of the user, the first digital identity data and the second digital identity data for use in authorizing the user;

prompting the user to authorize that they possess knowledge of the first digital identity data representing the network-based behaviors of the user across the one or more networks;

prompting the user to authorize that they possess knowledge of the second digital identity data representing the network-based behaviors of the user across the one or more networks;

receiving authorization information from the user in response to the prompt for the user to authorize using the first digital identity data and the second digital identity data;

determining whether the authorization information corresponds to the first digital identity data and the second digital identity data of the user;

in response to determining that the authorization information corresponds to the first digital identity data and the second digital identity data, granting the authorization request for the user; and in response to determining that the authorization information does not correspond to the first digital identity data and the second digital identity data, denying the authorization request for the user.

2. The method as in claim 1, wherein at least some of the first digital identity data is collected from a Wide Area Network.

3. The method as in claim 1, wherein at least some of the first digital identity data is collected from publicly available information.

4. The method as in claim 1, wherein at least some of the authorizing information regarding the user is received without knowledge of the user.

5. The method as in claim 1, wherein the digital identity include a combination of publicly available information and private information previously provided by the user.

6. The method as in claim 1, wherein the digital identity includes one or more of:

biometric information;

password information;

personal identification information;

financial information; and device information.

7. The method as in claim 6, wherein;

the biometric information includes one or more of a fingerprint, facial recognition, iris scan, and voice recognition;

the password information includes one or more of a previously chosen word, phrase, and personal identification number;

the personal identification information includes one or more of a driver's license number, military identification number, and social security number;

the financial information includes one or more of bank account information, and purchase history credit card information; and the device information includes one or more of MAC, serial number, and device identifiers, device Bluetooth connectivity information, fitness tracker information, USB key, and third-party device information.

8. A system for authenticating access, the system comprising:

one or more processors; and one or more non-transitory computer-readable media storing computer-executable instructions that, when executed by the one or more processors, cause the one or more processors to perform operations comprising:

receiving an authorization request to authorize a user;

collecting, by an identity system, first digital identity data and second digital identity data representing network-based behaviors of the user across one or more networks;

generating, by the identity system, a digital identity of the user, wherein the digital identity includes one or more of a medical history of the user, a purchasing behavior of the user, a bank balance of the user, or an age of the user;

generating, by the identity system, a digital identity of the user, the digital identity of the user comprising an online identity of the user determined based at least in part on the network-based behaviors of the user across one or more networks;

randomly selecting, from the digital identity of the user, the first digital identity data and the second digital identity data for use in authorizing the user;

prompting the user to authorize that they possess knowledge of the first digital identity data representing the network-based behaviors of the user across the one or more networks;

prompting the user to authorize that they possess knowledge of the second digital identity data representing the network-based behaviors of the user across the one or more networks;

receiving authorization information from the user in response to the prompt for the user to authorize using the first digital identity data and the second digital identity data;

determining whether the authorization information corresponds to the first digital identity data and the second digital identity data of the user;

in response to determining that the authorization information corresponds to the first digital identity data and the second digital identity data, granting the authorization request for the user; and in response to determining that the authorization information does not correspond to the first digital identity data and the second digital identity data, denying the authorization request for the user.

9. The system as in claim 8, wherein at least some of the first digital identity data is collected from a Wide Area Network.

10. The system as in claim 8, wherein at least some of the first digital identity data is collected from publicly available information.

11. The system as in claim 8, wherein at least some of the authorizing information regarding the user is received without knowledge of the user.

12. The system as in claim 8, wherein the digital identity include a combination of publicly available information and private information previously provided by the user.

13. The system as in claim 8, wherein the digital identity includes one or more of:

biometric information;

password information;

personal identification information;

financial information; and device information.

14. The system as in claim 13, wherein;

the biometric information includes one or more of a fingerprint, facial recognition, iris scan, and voice recognition;

the password information includes one or more of a previously chosen word, phrase, and personal identification number;

the personal identification information includes one or more of a driver's license number, military identification number, and social security number;

the financial information includes one or more of bank account information, and purchase history credit card information; and the device information includes one or more of MAC, serial number, and device identifiers, device Bluetooth connectivity information, fitness tracker information, USB key, and third party device information.

15. One or more non-transitory computer-readable media storing computer-executable instructions that, when executed by one or more processors, cause the one or more processors to perform operations comprising:

receiving an authorization request to authorize a user;

collecting, by an identity system, first digital identity data and second digital identity data representing network-based behaviors of the user across one or more networks;

generating, by the identity system, a digital identity of the user, wherein the digital identity includes one or more of a medical history of the user, a purchasing behavior of the user, a bank balance of the user, or an age of the user;

generating, by the identity system, a digital identity of the user, the digital identity of the user comprising an online identity of the user determined based at least in part on the network-based behaviors of the user across one or more networks;

randomly selecting, from the digital identity of the user, the first digital identity data and the second digital identity data for use in authorizing the user;

prompting the user to authorize that they possess knowledge of the first digital identity data representing the network-based behaviors of the user across the one or more networks;

prompting the user to authorize that they possess knowledge of the second digital identity data representing the network-based behaviors of the user across the one or more networks;

receiving authorization information from the user in response to the prompt for the user to authorize using the first digital identity data and the second digital identity data;

determining whether the authorization information corresponds to the first digital identity data and the second digital identity data of the user;

in response to determining that the authorization information corresponds to the first digital identity data and the second digital identity data, granting the authorization request for the user; and in response to determining that the authorization information does not correspond to the first digital identity data and the second digital identity data, denying the authorization request for the user.

16. The one or more non-transitory computer-readable media as in claim 15, wherein at least some of the first digital identity data is collected from a Wide Area Network.

17. The one or more non-transitory computer-readable media as in claim 15, wherein at least some of the first digital identity data is collected from publicly available information.

18. The one or more non-transitory computer-readable media as in claim 15, wherein at least some of the authorizing information regarding the user is received without knowledge of the user.

19. The one or more non-transitory computer-readable media as in claim 15, wherein the digital identity include a combination of publicly available information and private information previously provided by the user.

20. The one or more non-transitory computer-readable media as in claim 15, wherein the digital identity data includes one or more of:

biometric information;

password information;

personal identification information;

financial information; and device information.

* * * * *